Aug. 17, 1954 F. J. REED ET AL 2,686,845

EQUIPMENT FOR USE WITH ELONGATED MAGNETIC RECORDS

Filed Feb. 28, 1948 4 Sheets-Sheet 1

INVENTORS
Frank J. Reed
Lloyd J. Bobb

BY

Synnestvedt & Lechner
ATTORNEYS.

Aug. 17, 1954 F. J. REED ET AL 2,686,845

EQUIPMENT FOR USE WITH ELONGATED MAGNETIC RECORDS

Filed Feb. 28, 1948

4 Sheets-Sheet 2

INVENTORS
Frank J. Reed
Lloyd J. Bobb

BY

Synnestvedt & Lechner
ATTORNEYS.

Aug. 17, 1954 F. J. REED ET AL 2,686,845

EQUIPMENT FOR USE WITH ELONGATED MAGNETIC RECORDS

Filed Feb. 28, 1948

4 Sheets-Sheet 3

INVENTORS
Frank J. Reed
Lloyd J. Bobb

BY

ATTORNEYS.

Aug. 17, 1954 F. J. REED ET AL 2,686,845

EQUIPMENT FOR USE WITH ELONGATED MAGNETIC RECORDS

Filed Feb. 28, 1948 4 Sheets-Sheet 4

INVENTORS
Frank J. Reed
Lloyd J. Bobb
BY Symmestvedt & Lechner
ATTORNEYS.

Patented Aug. 17, 1954

2,686,845

UNITED STATES PATENT OFFICE 2,686,845

EQUIPMENT FOR USE WITH ELONGATED MAGNETIC RECORDS

Frank J. Reed, Philadelphia, and Lloyd J. Bobb, Glenside, Pa., assignors to The International Electronics Company, Philadelphia, Pa., a corporation of Pennsylvania Application February 28, 1948, Serial No. 11,994

24 Claims. (Cl. 179—100.2)

This invention relates to machines of the type adapted to record and reproduce elongated magnetic records, the equipment of the present invention being especially adaptable to the handling of such records in tape form, for instance a paper tape carrying a coating having magnetizable particles dispersed therein.

One of the primary objects of the present invention is to overcome a difficulty which has heretofore been encountered in equipment of this general nature. Heretofore considerable difficulty has been experienced in providing a tape handling or translating mechanism free of irregularity in speed of tape translation, the effect of which has been to introduce what is known as "wow." According to the present invention, a highly stable tape translating and handling mechanism is provided.

Before considering certain other objects and advantages of the invention, it is noted that briefly described, a machine according to the present invention incorporates a pair of tape reels between which the tape is adapted to be fed, preferably in either direction. The machine further includes a tape driving capstan frictionally engaging the tape in its path of travel between the reels, this capstan serving to determine the speed of translation.

In a machine of this general organization, it is a further object of the present invention to provide drive and brake mechanisms for the tape reels which are operative, preferably automatically, to maintain the tape under tension during translation thereof and to apply a braking force, both of which functions are effected in a yielding manner, whereby to eliminate danger of damage to the tape or breakage thereof under various conditions of operation.

In accomplishing the foregoing the invention makes use of a single slip clutch for each tape reel, through which both the reel driving and the reel braking forces are applied.

In accordance with still another aspect of the invention, a reversible driving motor is utilized to provide for tape drive in either direction between the pair of reels.

A further object of the invention is to provide for the drive of the tape engaging capstan from the shaft of the reversible motor through a minimum number of intermediate driving elements, this being of importance both from the standpoint of reduction in complication and also from the standpoint of minimizing tendency to wow.

Another important feature of the invention is the provision of a turntable mounting (for disc records) on the tape driving capstan. In the preferred arrangement the drive for the capstan is arranged to provide the standard 78 R. P. M., and the capstan itself is so proportioned as to provide the desired speed of tape translation when rotating at 78 R. P. M. In this way disc records may be driven by the equipment of this invention at the conventional speed, and if desired such a recording may be transferred from a disc record to a tape record, both the disc record and the tape record being concurrently driven by a common drive mechanism characterized by high stability, as above mentioned.

Still another feature of the invention is related to the erasure of recorded tracks on a tape record. Thus, the invention contemplates the making of a tape record having two side-by-side tracks thereon, one of which is recorded in one direction and the other in the opposite direction. The equipment of the invention makes provision for selectively erasing and re-recording either of said tracks.

Still other objects of the invention are related to improvements in controls for reversing the direction of tape translation, for applying the reel brakes, for effecting rewind, etc.

How the foregoing objects and advantages are attained, together with others which are pointed out hereinafter, will be apparent from the following description referring to the accompanying drawings, in which—

Figure 1:
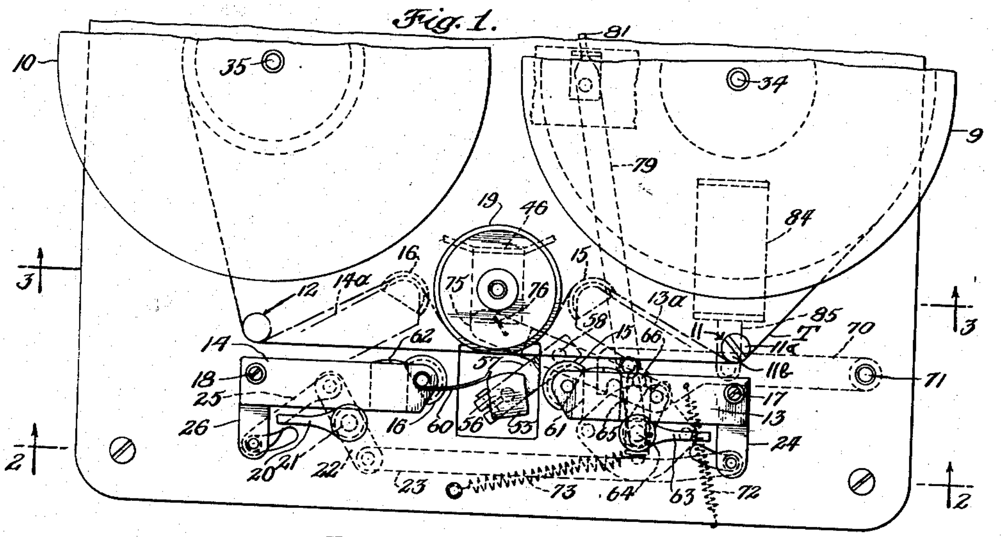
Figure 1 is a partial top plan view of a machine constructed according to the present invention.

The tape reels are indicated at 9 and 10 and a tape is shown at T. As best seen in Figure 1, the path of the tape between the reels is defined in part by a pair of guide posts 11 and 12. A pair of pivoted arms 13 and 14 carry tape guide elements 15 and 16, these arms being angularly movable about their pivots 17 and 18 between the full line positions shown in Figure 1 and the dotted positions 13a and 14a. In the latter position (which is the operating position), the tape is carried around a portion of the circumference of the tape driving capstan 19 having a mounting shaft 19a. It is here mentioned that shifting of the arms 13 and 14 (which carry tape guide elements 15 and 16) between the full line positions and the dotted line positions above mentioned is provided for in order to facilitate threading of a tape in the machine, as is fully disclosed and also claimed in copending application of Frank J. Reed, Serial Number 368,172 filed July 15, 1953, a continuation of application Serial No. 742,776, filed April 21, 1947, and assigned to the assignee of the present application. This shifting movement is effected by means of an operating knob 20 (see Figure 2) mounted on a shaft 21 which carries a double-ended lever 22 one end of which is linked as at 23 with an arm 24 carried by the pivot member 17 and arm 13, the other end of lever 22 being linked as at 25 with an arm 26 carried by the pivot 18 for arm 14.

With further reference to the guide elements 15 and 16 attention is called to the fact that the lower portions thereof are provided with tapered or inclined surfaces 15a and 16a (see Figure 2) which act on the tape upon movement of the arms 13 and 14 toward the capstan to properly position the tape with reference to the capstan and thus also with reference to the recording head (described herebelow).

It is now pointed out that in the embodiment of the machine illustrated, it is contemplated (for either recording of a tape or for playback of a recorded tape) that the tape be initially translated from reel 9 to reel 10 and thereafter translated in the opposite direction. During each run of the tape a separate track is recorded or reproduced. Toward the end of the initial run, it is contemplated that automatic reversal of direction of translation shall take place, this being provided for by applying a metal contact element to the tape adapted to interconnect the two contact elements 11a and 11b which are incorporated in the guide post 11. This arrangement for reversal of the drive is also disclosed in the copending application above mentioned.

Figures 4, 5:
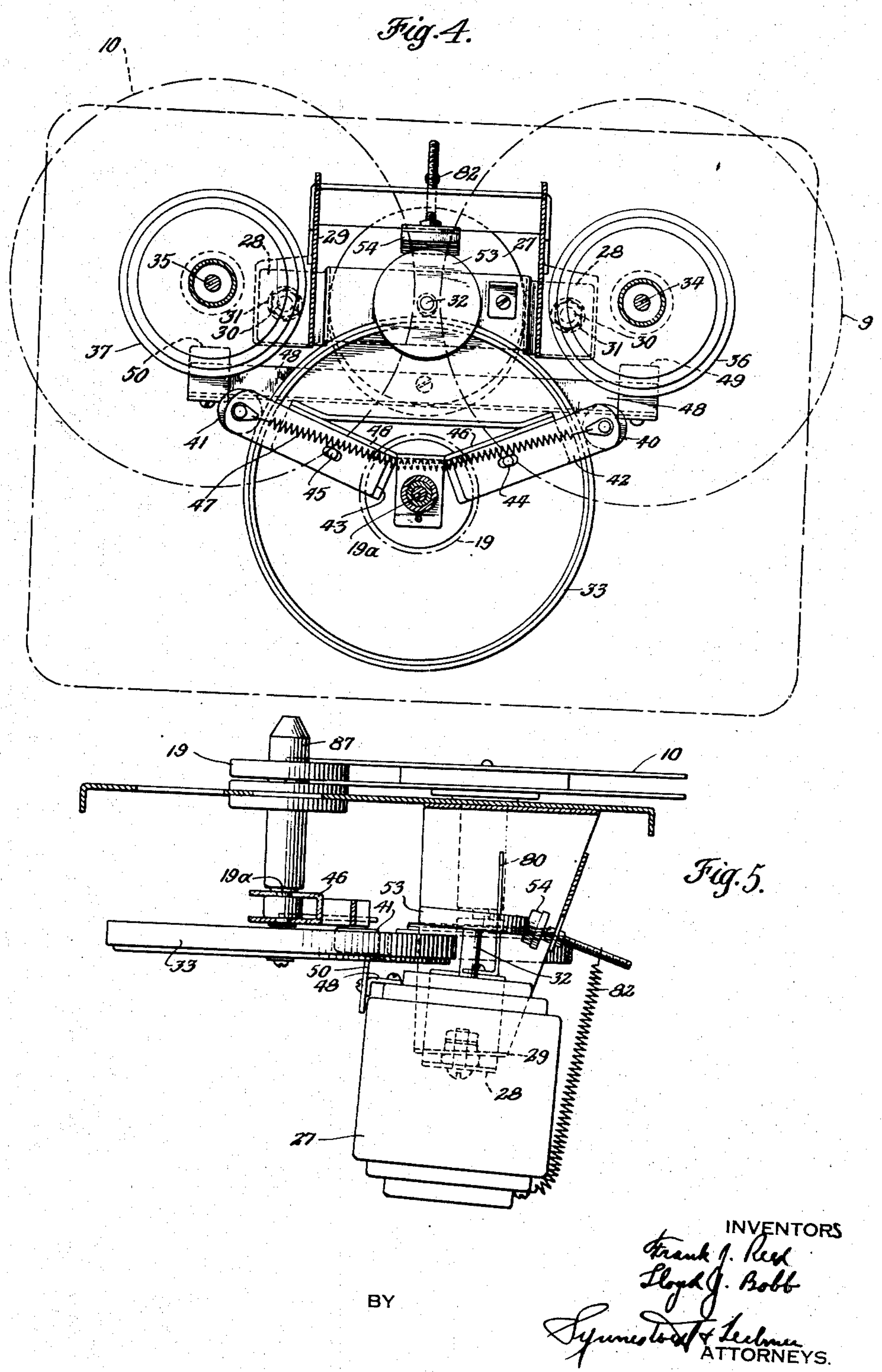
Figure 4 is a horizontal sectional view taken as indicated by the line 4—4 on Figure 2.
Figure 5 is a vertical sectional view taken as indicated by the line 5—5 on Figure 3.
Figure 7:
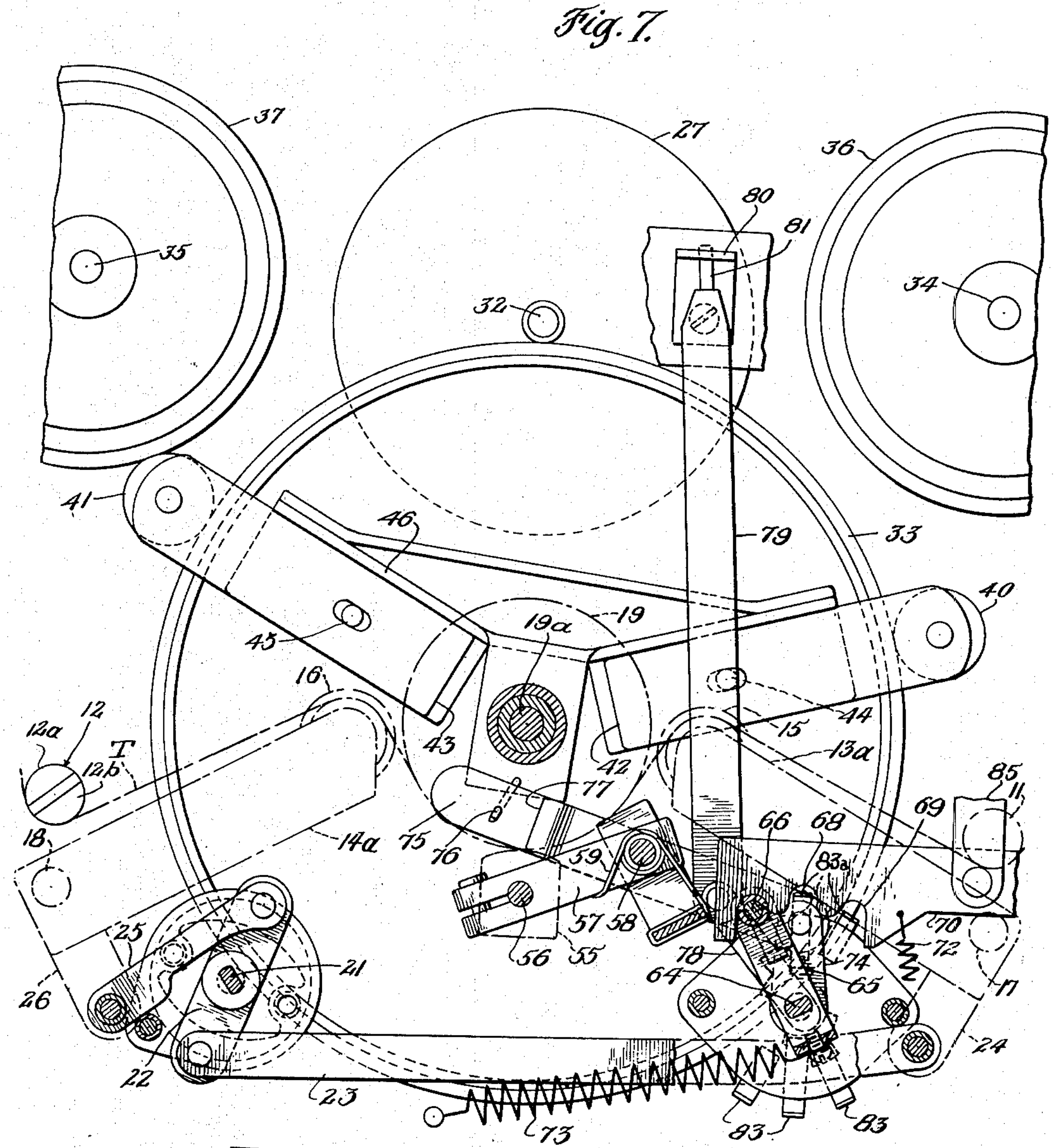
Figure 7 is a view similar to Figure 6 but incorporating certain additional parts, and showing various parts in different positions of adjustment.

Before proceeding with further description of various parts of the machine illustrated in the drawings, it is also noted that in all figures except for Figure 7, the parts are shown in a neutral condition. This "neutral" condition represents a condition intermediate the driving conditions for effecting translation of the tape in the two directions. Turning now to the capstan and reel drives, it is first noted that the motor which is indicated at 27 is a reversible motor. This motor has a mounting yoke secured thereto, having lateral projections 28 which are fastened to fixed supporting members 29 by means of bolts 30 extended through oversized apertures in at least one of the members 28 or 29. Resilient, for instance soft rubber, washers 31 are interposed between the pairs of members 28—29 and provide freedom for tilting movement of the motor in a direction about a transverse horizontal axis passing through the mounting joints 28—29—30—31. Thus, as seen in Figure 5, the motor shaft 32 is free to oscillate somewhat toward the left or right when viewed as in this figure. With the parts in neutral as shown, the motor shaft 32 is disengaged from the capstan driving disc 33 which is fixed to the capstan shaft 19a. The disc 33 is preferably surfaced with a friction material such as rubber and this disc being connected with the capstan driving shaft serves to drive the capstan when the motor shaft 32 is swung into engagement with the periphery of the disc. It is here pointed out that the capstan driving disc is of quite large diameter and that the relatively small diameter motor shaft itself is adapted to be brought into engagement with the driving disc. In this way direct drive of the capstan is provided, without the introduction of any intermediate driving elements for either direction of operation. Specifically, the speed of the motor, the diameter of the motor shaft and the diameter of the capstan driving disc are so selected as to impart to the capstan a rotational speed of 78 R. P. M. Since the motor and its shaft are rotating at relatively high speed in relation to the speed of the capstan, and since intermediate driving elements are eliminated, the drive is an exceedingly stable one, which is of great advantage, as is recognized in this art.

Turning now to the drive for the tape reels, it will be seen that reel 9 has a mounting shaft 34 and reel 10 a mounting shaft 35. Drum or disc members 36 and 37 are rotatively mounted on the respective reel shafts and are connected with the shafts through the intermediation of friction clutches 38 and 39. As seen toward the left of Figure 2, the clutch members are yieldingly pressed against the drum members by annularly corrugated springs connected with the reel shafts.

As best seen in Figures 4 and 7 reel drive is effected through the rotative idler members 40 and 41 which are carried by plates 42 and 43 having pin and slot connections 44 and 45 with opposite ends of a rockable beam 46 which is pivoted coaxially of the capstan driving shaft 19a. An elongated tension spring 47 serves to draw the idler rollers 40 and 41 inwardly and thus maintain them in engagement with the periphery of the capstan driving disc 33. Upon rocking motion of the support or beam 46, one or the other of the idlers 40 and 41 is brought into engagement with a reel driving member (36 or 37). Control for shifting the idler support 46 is coordinated with the control for reversing the direction of operation of the motor, as described herebelow.

Figures 2, 3:
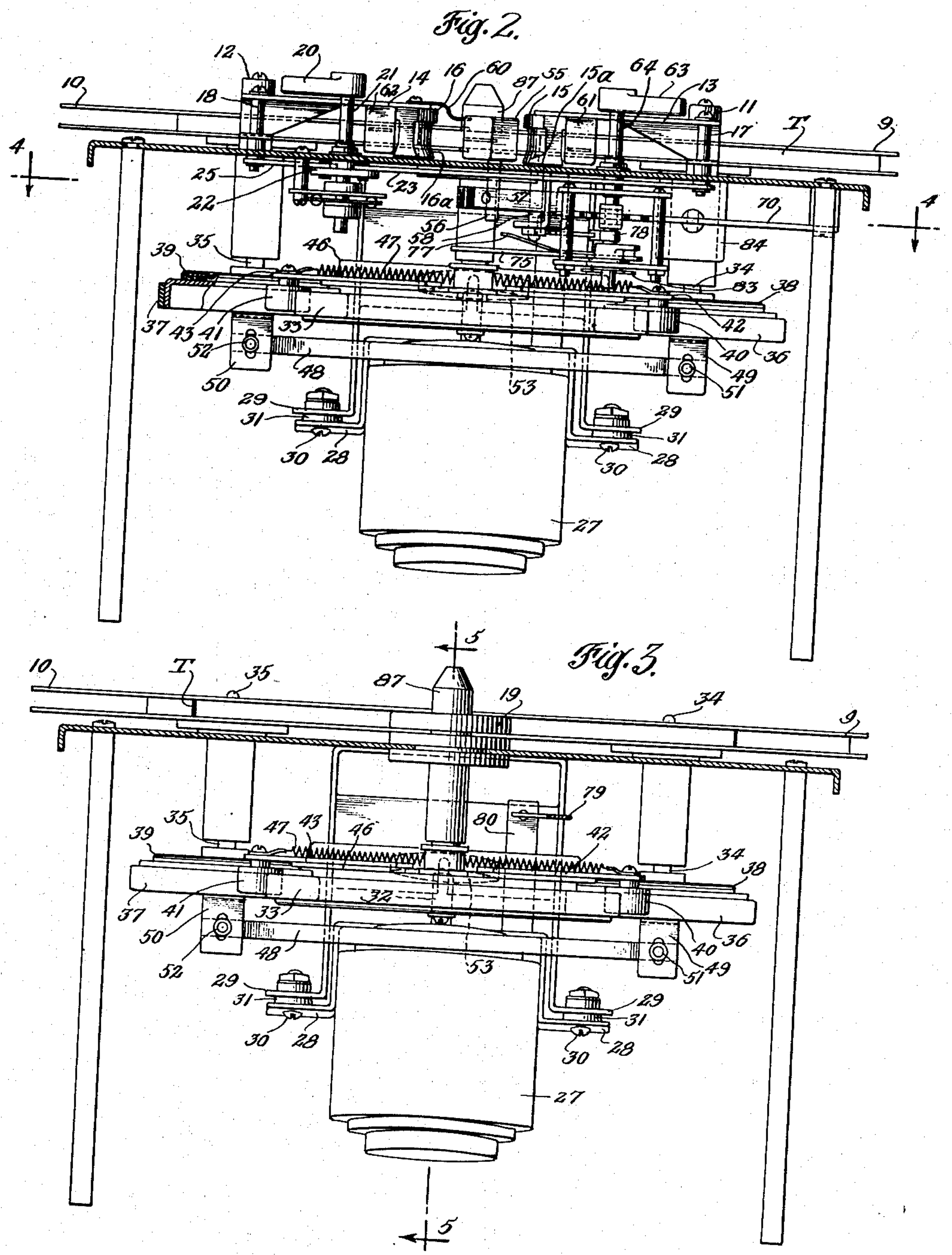
Figure 2 is a front elevational view, taken substantially as indicated by the line 2—2 on Figure 1.
Figure 3 is a view of various parts taken as indicated by the line 3—3 on Figure 1.

As best seen in Figures 2, 3 and 5, brake mechanism is provided for arresting rotation of the tape reels. This mechanism includes a transverse bar 48 carried by the motor and movable therewith. The bar in turn carries a pair of brake shoes 49 and 50 which are adjustably mounted thereon as by the screw and slot devices indicated at 51 and 52. As clearly appears from Figure 5, when the motor is tilted to disengage the motor shaft 32 from the capstan driving disc 33, the brake shoes 49 and 50 are brought into engagement with the members 36 and 37 which are mounted on the reel shafts. It may here be noted that the clutch devices 38 and 39, being interposed between the reels and the members 36 and 37, perform several different functions in the arrangement of the invention. On the one hand these clutch devices operate to provide slippage during reel drive, so that the reel being employed for take-up of the tape will at all times maintain the tape in tension and serve the desired take-up function, without, however, disturbing the desired speed of translation of the tape as determined by the tape driving capstan. The clutch devices 38 and 39 are also operative when the brakes 49 and 50 are applied, in order to prevent any undue or sudden strain on the tape as a result of rapid application of the brakes.

The motor shaft 32 further carries a brake disc 53 adapted to engage an adjustable friction brake pad 54, as clearly appears in Figures 4 and 5. This brake device serves to rapidly decelerate the motor whenever the motor shaft is disengaged from the capstan driving disc 33.

Figure 6:
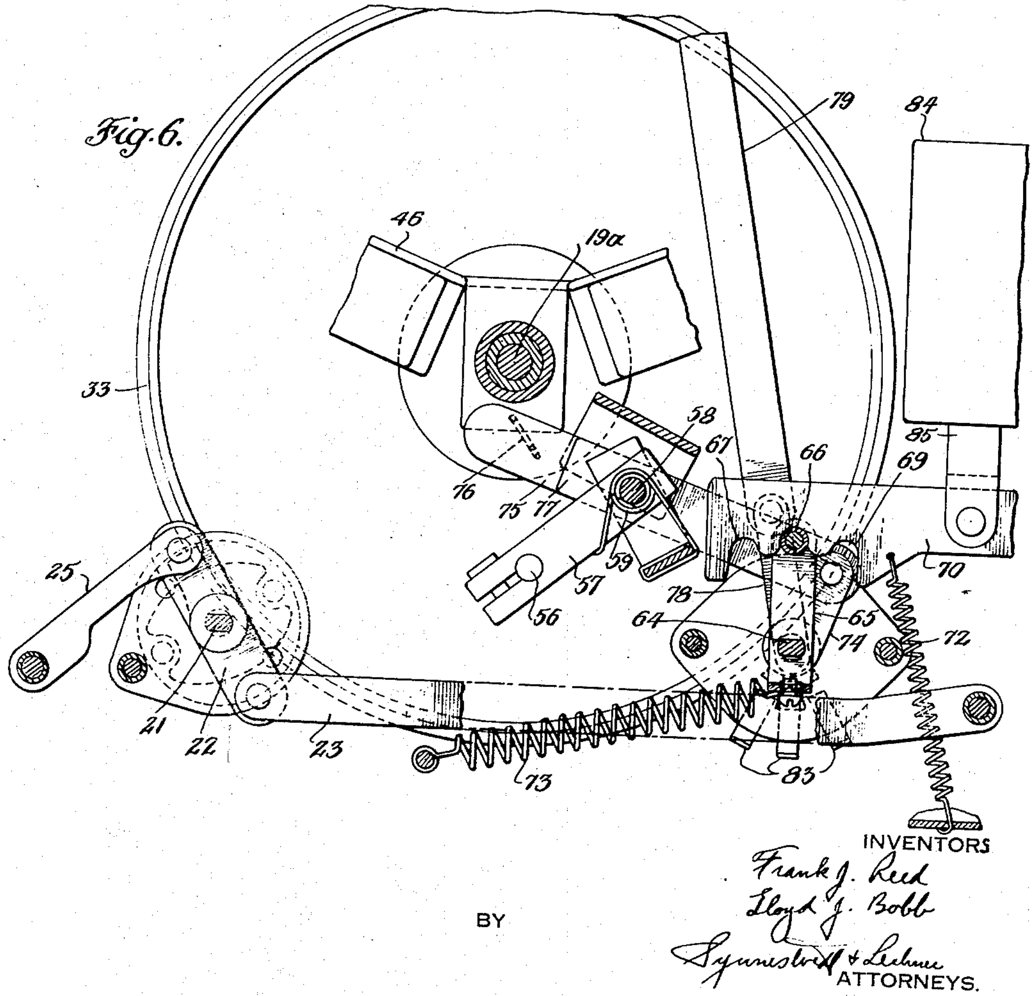
Figure 6 is a horizontal sectional view of certain of the control parts, this view being on an enlarged scale as compared with Figures 1 to 5 inclusive.

Turning again to Figures 1, 2, 6 and 7 a magnetic recording-reproducing head 55 is mounted on a vertical pin 56 which is carried by an arm 57 pivoted at 58. Pivot 58 provides freedom for swinging of arm 57 to move the recording head into and out of engagement with the tape on the capstan. A torsion spring 59 (see Figures 6 and 7) associated with pivot 58 serves normally to urge the head 55 against the capstan. The head is moved away from the capstan by means of an abutment member 60 which is carried by the pivoted arm 14. Thus, when the arm 14 is swung to the full line position shown in Figure 1, the head is displaced from the capstan, thereby facilitating threading of a tape in the machine, as is fully described in the copending application above identified.

Pivot 58 for the head mounting arm 57 is further vertically movable whereby to shift the pole pieces of the head from one track to the other of the tape record. The manner in which this is accomplished is described below in connection with various of the control devices provided by the invention.

It is noted that each of the arms 13 and 14 carries an erase head, one of these being shown at 61 and the other at 62. As seen in Figure 2 the pole pieces of the two erasing heads are vertically offset from each other so as to cooperate respectively with the two tracks on the tape record. When a recording is being made the erasing head in advance of the capstan and recording head is energized so as to obliterate any previously recorded material on that track. Selective energization of the erase heads is effected by control mechanism described below.

Turning now to the controls for reversing the drive, operating the brakes, etc., first note that as seen in Figure 2 a control handle 63 is mounted on a control shaft 64. This control shaft carries an arm 65 having a pin 66 adapted to alternatively engage one or another of the three notches 67, 68 and 69 formed in the edge of a lever 70 which is pivoted at 71 (see Figures 1 and 2). The notches 67, 68 and 69 correspond respectively with "Forward," "Neutral" and "Reverse" settings or adjustments of the machine. Lever 70 is biased into engagement with the pin 66 by means of a spring 72, although manual rotation of the control handle 63 will displace the lever, so that the machine may be manually adjusted to any of the three positions referred to.

A spring 73 serves to bias the control to the reverse position, i. e., with pin 66 in engagement with notch 69, although it is here mentioned that spring 73 will not move the control unless the lever 70 is displaced (such displacement being effected in a manner described below).

The control shaft 64 further carries an arm 74 for operating a link 75 having a spring connection 76 with a portion of the support or beam 46 for the idler rollers 40 and 41. When the control is adjusted to the Forward position (as in Figure 7) the link 75 is shifted to the left, thereby causing engagement of idler roller 41 and drive of reel 10 through the drive element 37. Adjustment of the control to the Reverse position brings the idler roller 40 into operation, to drive the other tape reel. In the Neutral setting the idler support 46 is positioned so that neither of the idler rollers are engaged.

A spring-like cam member 77 is also carried by the link 75, so as to be moved therewith by arm 74, this cam element being positioned to engage the lower end of the head mounting pivot 58 (see Figure 2), to thereby appropriately shift the head vertically from one track to the other, according to the position of adjustment. Control shaft 64 still further carries an arm 78 which is pivoted to a link 79. Link 79 is extended for connection with an arm 80 attached to the motor, as clearly appears in Figure 5, the arm 80 having an aperture therein through which a pin 81 projects, such pin being arranged at the remote end of link 79 as appears in Figures 1 and 3. When the control is shifted, the arm 78 and link 79 operate as a toggle or over-center device. In the Neutral position (see Figures 1 and 6) the link reacts against the arm 80 and thereby tilts the motor so as to disengage the motor shaft 32 from the capstan driving disc 33. On the other hand, in either the Forward or Reverse positions of adjustment, the link 79 is withdrawn, permitting the spring 82 (see Figure 5) to tilt the motor in the direction to bring the motor shaft into engagement with the capstan driving disc.

Control shaft 64 further carries a switch 83 which is associated with the motor windings and with a suitable source of current so as to effect reversal in operation of the motor as between the Forward and Reverse positions of adjustment and so as to stop the motor in the Neutral position of adjustment.

A point of importance to be noted in this connection is that the controls are so arranged and coordinated that whenever the motor is stopped (the Neutral setting) the motor shaft is disengaged from the capstan driving disc 33. This is a safety factor of considerable importance because if the machine were to be permitted to stand with the motor shaft in engagement with the resilient friction material at the periphery of the capstan driving disc, an indentation in this resilient material would be produced, and this would impair the desirable highly stable drive contemplated by the invention.

With still further reference to the controls, attention is now called to the solenoid 84 (see Figures 1, 2, 6 and 7). This solenoid has an armature 85 which is pivoted to the lever 70 so that upon energization of the solenoid the lever 70 is swung away from the control shaft 64, to thereby release pin 66 from engagement with any of the notches 67, 68 and 69. The solenoid is adapted to be operated by the switch comprising parts 11a and 11b of the guide post 11 hereinabove described. For this purpose the two switch elements 11a and 11b are insulated from each other in the guide post and a metal contact is applied to the tape toward one end of a record thereon, so that upon engagement of the contact with the switch members 11a and 11b the solenoid is energized, thereby disengaging lever 70 of the control mechanism. This permits return spring 73 to move the control shaft to the Reverse position.

Finally, control shaft 64 carries a switch for selectively energizing one or the other of the erase heads 61 and 62. Thus, as seen in Figure 7, a switch comprising contacts 83a is actuable by the control shaft. It will be understood that the windings of the erase heads are appropriately connected with the switch contacts 83a and with a source of erasing current only during the time the equipment is being employed for recording purposes. As will be understood, the connections are such as to energize only that erase head which is located in advance of the recording head during translation of the tape in each direction. When the equipment is being used for reproduction the source of erasing current is either disabled or disconnected, so as not to obliterate recordings being played. Electronic or other means for setting up an erasing current form no part of the present invention per se, but it may be noted that an arrangement for this purpose is fully disclosed in the copending application of Lloyd J. Bobb, Serial No. 787,644, filed November 24, 1947, now Patent No. 2,641,655, assigned to the assignee of the present application.

A typical operation is as follows:

Assume first that it is desired to make a two-track recording on a tape record. A reel carrying the tape to be recorded is mounted on reel shaft 34 and the free end of the tape is threaded around the guide posts 11 and 12 (the arms 13 and 14 being withdrawn at this time), and the free end is secured to a reel carried by reel shaft 35. The control 20 is adjusted to advance the arms 13 and 14 to the positions shown at 13a and 14a in Figures 1 and 7. This brings the recording head against the tape on the capstan and recording may commence on the lower track of the tape. The machine is then conditioned for forward operation by adjustment of the control 63 to bring the control parts to the positions illustrated in Figure 7. At this time the erase head 61 is energized by switch contacts 83a, so as to ensure erasure of any previously recorded material on the lower track.

Toward the end of the run of the tape from reel 9 to reel 10, the contact element carried by the tape bridges the switch members 11a and 11b and thereby trips solenoid 84, in consequence of which spring 73 reverses the operation. During the course of this reversal the brakes for the reel shafts are applied, the brake for the motor shaft is applied, the recording head is shifted to the upper track, and translation of the tape in the reverse direction commences. At this time the erase head 62 may be energized, and recording then proceeds in the reverse direction on the upper track of the tape.

Operation for playback or reproduction is essentially the same as that described above for recording, except that for playback neither of the erase heads is energized, as is mentioned above.

Should it be desired at any time to rewind a tape record, or any portion thereof, in either direction of travel, all that is required is to adjust the control knob 20 so as to withdraw the arms 13 and 14. This displaces the recording head and also releases the tape from engagement with the capstan, and in consequence the speed of the tape is increased. Such increase in speed occurs because of the fact that the reels are "overdriven," and no slippage occurs at the reel clutches, since the tape is not in engagement with the capstan.

Figure 8:
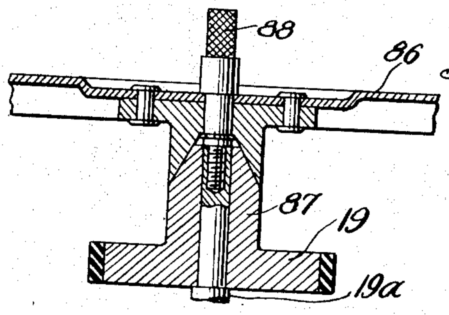
Figure 8 is a fragmentary vertical sectional view through the tape driving capstan and a turntable for disc recordings mounted thereon.

It is contemplated according to the invention that recordings may be made from a variety of signal sources, one of which may comprise disc recordings of standard type, which may be supported and driven through the capstan drive, as by employing a turntable such as is shown fragmentarily at 86 in Figure 8. As here seen a standard 87 projects upwardly from the capstan 19, and serves to removably support the turntable 86 as by means of a removable screw 88 acting also as a spindle for engaging the center hole of the standard record disc. As hereinabove mentioned, the drive is arranged so as to rotate capstan 19 at 78 R. P. M. which is the standard accepted for phonograph disc recordings.

When it is desired to transfer a plurality of recordings from disc records to a tape record, the procedure may be as follows: A loaded reel is placed in the machine on spindle 34 and the free end threaded to a reel on spindle 35. A turntable may then be mounted upon the capstan and a plurality of disc records successively played on the turntable, the signal from the pick-up being delivered to the recording head through appropriate circuits which need not be considered herein. It is mentioned, however, that appropriate circuits for this purpose are disclosed in the copending application of Lloyd J. Bobb above identified. When it is desired to record the second and oppositely oriented track on the tape, instead of reversing direction of drive, the full reel is now removed from spindle 35 and turned over and placed upon spindle 34. The tape is then threaded through the machine in the manner described shortly above and an additional series of disc recordings may be transferred to the tape, with the machine running in the same direction, i. e., that direction which causes rotation of the capstan in the same sense required in the handling of disc records. A tape record made in this way may, of course, be played back merely by placing the reel on spindle 34 and toward the end of the feed in one direction, the feed may be reversed and the other track reproduced.

The machine fully described above is outstanding in stability of drive, which is a very important consideration, as is well recognized in this art.

We claim:

1. Equipment for use with an elongated magnetic record adapted to be fed from one reel to another, comprising a pair of reel supporting spindles, a record driving capstan adapted to engage a record in its path of feed between the reels, a motor having a driving shaft, the axes of said spindles, capstan and motor shaft all being substantially parallel, drive mechanism for interconnecting the capstan and the motor shaft including a drive element rotative with the capstan, drive control means having three positions of adjustment in one of which said drive element is driven in one direction, in another of which the drive element is driven in the opposite direction and in the third of which a neutral condition is established in which the drive element is not driven in either direction, disconnectible reel drive trains alternatively connectible to drive one reel or the other, and reel brakes with control mechanism therefor including brake operating connections coupled with the capstan drive control means, said connections operating to apply both reel brakes when the capstan drive control is in neutral position and to release both reel brakes when the drive control means is in either operating position.

2. Equipment for use with an elongated magnetic record adapted to be fed from one reel to another, comprising a pair of reel supporting spindles, a record driving capstan adapted to engage a record in its path of feed between the reels, a motor having a driving shaft, the axes of said spindles, capstan and motor shaft all being substantially parallel, drive mechanism for interconnecting the capstan and the motor shaft including a drive element rotative with the capstan, drive control means having three positions of adjustment in one of which said drive element is driven in one direction, in another of which the drive element is driven in the opposite direction and in the third of which a neutral condition is established in which the drive element is not driven in either direction, disconnectible reel drive trains each comprising a rotative reel drive member and a slip clutch connecting said member with the respective reel spindle, and reel brakes engageable with the reel drive members in advance of said slip clutches and having control mechanism including brake operating connections coupled with the capstan drive control means, said connections operating to apply both reel brakes when the capstan drive control is in neutral position and to release both reel brakes when the drive control means is in either operating position.

3. Equipment for use with a magnetic tape record adapted to be reversibly fed between a pair of reels, comprising a tape driving capstan engaging a tape in its path of feed between the reels, means for alternatively scanning different record tracks spaced transversely of a tape record according to the direction of feed of such a record, the scanning means being arranged to cooperate with a tape record in the region of the feed path adjacent the tape driving capstan, a pair of magnetic erasing heads located adjacent the feed path and offset in opposite directions from the scanning means, one of the erasing heads being positioned to cooperate with one of said record tracks and the other being positioned to cooperate with the other of said record tracks, and control mechanism for concurrently shifting said erasing heads away from the tape feed path to facilitate threading of a tape in the machine.

4. A construction in accordance with claim 3 in which the scanning means is mounted for displacement toward and away from the tape driving capstan and in which the control mechanism has a connection with the scanning means providing for displacement of the scanning means away from the tape driving capstan when the control mechanism is operated to shift the erasing heads away from the tape feed path.

5. Equipment for use with an elongated magnetic record adapted to be reversibly fed between a pair of reels, a record driving capstan adapted to engage a record in its path of feed between said reels, a drive disc fixed to rotate with said capstan, a reversible motor having a driving shaft engaging said disc, and a support for the motor providing for relative movement of the motor shaft into and out of frictional engagement with said disk.

6. A construction according to claim 5 and further including a motor reversing control operative to reverse the motor and to shut off the motor and, concurrently with shut-off, move the motor shaft out of engagement with said disc.

7. Equipment for use with an elongated magnetic record adapted to be fed between a pair of reels, comprising a pair of reel supporting spindles, a rotative drive disc, drive mechanism for said disc adjustable to alternatively effect rotation thereof in either direction, drive trains adapted alternatively to connect one or the other of said spindles with the drive disc, each drive train including a driven disc connected with a reel spindle and an idler movably mounted to connect and disconnect said driven disc with respect to said drive disc, a common support for said idlers pivotally mounted coaxially of said drive disc and providing for alternative connection of the reel drive trains, a manual control for the drive mechanism for alternatively adjusting said drive mechanism to effect rotation of the drive disc in either direction and a connection between said control and the idler support tending to shift said support to connect one reel drive train or the other according to the position of adjustment of said control.

8. Equipment for use with an elongated magnetic tape record adapted to be fed from one reel to another, comprising a rotative tape driving capstan adapted to engage a tape record in its path of feed between reels, a driving disc connected with the capstan, a motor driven element adapted to engage the disc, and a brake for the motor driven element, said driven element being arranged between the capstan driving disc and the brake and being shiftable in opposite directions to alternatively engage the drive disc and the brake.

9. Equipment for use with elongated magnetic tape records adapted to be fed between a pair of reels adjacent a magnetic scanning device, comprising disconnectible drive mechanism for driving one reel to wind a record thereon, a record driving capstan adapted to engage a record in its path of feed between the reels for effecting feed of the record in a direction toward said one reel, a disconnectible drive transmission for driving said capstan including a drive wheel rotative with the capstan and a rotative driving element shiftably movable into and out of engagement with said drive wheel, a second disconnectible drive mechanism for driving the other reel to wind a record thereon, a releasable brake for said first reel, and a control having operating connections with both of the reel drive mechanisms, with the shiftably movable driving element of the capstan drive transmission and with the brake, the control having three conditions of adjustment in one of which the brake is released, the first reel drive is connected and the second is disconnected and said capstan drive is connected, in the second of which the brake is applied and both of the reel drives and the capstan drive are disconnected, and in the third of which the brake is released and the second reel drive is connected and the first is disconnected.

10. A construction according to claim 9 and further including a magnetic recording head positioned to scan a track on a tape record in the path of feed between the reels during feed of the tape in said one direction, a magnetic erasing head positioned to scan said track during such tape feed, a disabling switch for the erasing head, and a connection between said control and the disabling switch for the erasing head and providing for disabling of the erasing head in said second and third conditions of adjustment of the control.

11. Equipment for use with elongated magnetic records comprising, in combination with a pair of reels between which a record is adapted to be fed and a magnetic scanning device adapted to cooperate with a record in its path of feed between the reels, a capstan element adapted to engage a record in the path of feed thereof between the reels to feed the record from one reel to the other, a driving element for the capstan element connected to rotate therewith, a motor having a driving member, a mount for the motor providing for movement thereof with its motor driving member to shift the driving member into and out of engagement with the capstan driving element, and a reel drive transmission including a drive member in peripheral engagement with one of said elements to transmit rotative drive therefrom to a reel to effect tape take-up.

12. In a magnetic recording machine of the kind adapted to feed an elongated magnetic tape record between a pair of reels, a rotatable record driving capstan frictionally engageable with a record in its path of feed between the reels, a shaft with which the capstan is rigidly connected for rotation therewith, a capstan drive wheel fixed to said shaft for rotation therewith and having a peripheral friction driving surface, an electric driving motor having a power shaft, motor mounting mechanism supporting the motor with its power shaft adjacent to and generally paralleling the axis of rotation of the capstan drive wheel, the motor mounting mechanism including pivot means providing for pivotal movement of the motor with its power shaft to engage and disengage the power shaft with the frictional driving surface of the capstan drive wheel, and a manual control having connections with the motor and alternatively adjustable to pivotally shift the motor with its power shaft to effect engagement and disengagement of the power shaft with the frictional driving surface of the capstan drive wheel.

13. A construction according to claim 12 in which the capstan and capstan drive wheel are positioned to rotate in horizontal planes and in which the motor is positioned with its power shaft projecting upwardly therefrom.

14. A construction according to claim 12 and further including a motor start-stop switch connected with said manual control and operated thereby to start the motor when the control is actuated to engage the power shaft with the capstan drive wheel and to stop the motor when the control is actuated to disengage the power shaft form the capstan drive wheel.

15. A construction according to claim 12 in which the motor is a reversible motor, in which the manual control has three positions of adjustment corresponding respectively to Forward drive, Stop, and Reverse drive, and in which the connections between the control and the motor provide for engagement of the power shaft with the capstan drive wheel in both Forward and Reverse positions of the control and for disengagement of the power shaft in Stop position, the construction further including a switch for the motor having three positions of adjustment corresponding to the three positions of the control, the switch being connected with the control and operated by adjustment thereof between said three positions.

16. In a magnetic recording machine of the kind adapted to feed an elongated magnetic tape record between a pair of reels, a pair of reel supporting spindles, a reversely rotatable drive disc, drive trains for driving the reel spindles from said drive disc, the drive trains being alternatively connectible, each drive train including a driven disc arranged coaxially of the respective reel spindle, a slip clutch in each reel drive train located between said driven disc and the respective reel spindle, and a pair of reel brakes respectively engageable with the driven discs of the reel drive trains.

17. Equipment for use with elongated magnetic tape records adapted to be fed between a pair of reels comprising, in combination with a spindle for supporting a supply reel and a spindle for supporting a take-up reel, a disengageable capstan drive for the record arranged to engage a record in the path of feed between the reels to establish constant speed record feed from the supply reel to the take-up reel, a releasable brake for the take-up reel, a drive motor, drive mechanism connected with the motor and with the supply reel and providing high speed re-wind of the record from the take-up reel to the supply reel when the disengageable capstan drive for the record is disengaged, a switch for starting and stopping the motor, and control mechanism including manually operable control means adjustable between two conditions corresponding to motor-on and motor-off, and connections between said control means and the switch and between the control means and the reel brake providing for engagement of the brake when the control means is adjusted to the condition corresponding to motor-off and for brake release when the control means is adjusted to the condition corresponding to motor-on.

18. In a magnetic recording machine of the kind adapted to feed an elongated magnetic tape record between a pair of reels, a rotatable record driving capstan frictionally engageable with a record in its path of feed between the reels, a capstan drive wheel, the capstan and capstan drive wheel being fixed to rotate together about a common axis, a rotative drive element for a reel, an idler for interconnecting the reel drive element and the capstan drive wheel, a support for said idler mounted for pivotal movement coaxially of the capstan and its drive wheel to provide for connection and disconnection of the drive from the capstan drive wheel to the reel drive element, a control for pivotally moving said idler support, a reel brake engageable and disengageable with said reel drive element, and a brake operating connection coupled with said control and operative to apply the brake when the idler is pivoted out of engagement with the reel drive element and to release the brake when the idler is pivoted into engagement with the reel drive element.

19. A construction in accordance with claim 18 and further including a slip clutch in the reel drive between the reel and said reel drive element.

20. Apparatus for use with an elongated magnetic tape record comprising, in combination with a pair of reels between which the tape is adapted to be fed, a pair of upright reel spindles on which the reels are individually supported and between which they may be invertingly interchanged, means establishing a normal inter-reel tape-threading path having a central section from the ends of which the tape passes substantially directly to the respective reels, scanning and driving means for the tape including elements positioned during tape threading at opposite sides of the tape-threading path in said central section thereof and relatively movable for scanning into tape-engaging positions, said elements including a magnetic head positioned widthwise of the tape to scan one only of two lanes on one face of the tape lying on opposite sides of the longitudinal center line of that face, means effective during scanning for rotating the reel toward which the tape is driven whereby to wind up the driven tape, the tape being wound on the other reel in a direction such that the unwinding therefrom is accompanied by rotation thereof in the same rotational direction as that of the driven toward reel, said directions of winding and said widthwise positioning of the head rendering an inverting interchange of the reels with respect to the spindles effective to present the same tape face to the head but to change the lane scanned and the direction of scanning, said central threading-path section being upwardly open and substantially straight and said ends thereof being relatively closely adjacent the peripheries of the respective reels whereby to facilitate such interchange while respective portions of the tape remain wound on both reels.

21. Apparatus for use with elongated magnetic tape records adapted to be fed between a pair of reels, comprising a pair of spaced upright reel spindles on which the reels are individually removably supported and between which the reels are invertingly inter-changeable, means establishing a normal inter-reel tape-threading path having a central section offset from the plane of the reel spindles, from each end of which the tape passes substantially directly to a respective reel at the side thereof away from the other reel, scanning and driving means for the tape including elements positioned during tape threading at opposite sides of the tape-threading path at said central section thereof and relatively movable for scanning into tape-engaging positions, said elements including a magnetic head positioned widthwise of the tape to scan one only of two lanes on one face of the tape lying on opposite sides of the longitudinal center line of that face, means effective during scanning for rotating the reel toward which the tape is driven whereby to wind up the driven tape, said directions of passage of the tape to the respective reels and said widthwise positioning of the head rendering an inverting inter-change of the reels with respect to the spindles effective to present the same tape face to the head but to change the lane scanned and the direction of scanning, said central threading-path section being upwardly open and substantially straight and said ends thereof being relatively closely adjacent the peripheries of the respective reels whereby to facilitate such interchange while respective portions of the tape remain wound on both reels.

22. In a magnetic recording and/or reproducing instrument that includes mechanism that is convertible between operating and idle conditions, a controller for said mechanism that is movable between two positions wherein respectively it is effective to maintain said mechanism in its operating conditions, a record body-driving capstan assembly including a flywheel having a peripheral frictional driving surface, a motor having an output spindle and means pivotally supporting said motor with said spindle substantially parallel to the axis of said flywheel and for lateral movement of said spindle to and from contact with said peripheral driving surface, and spring means biasing said motor toward pressure-exerting contact of said spindle against said peripheral driving surface; a common actuator movable between two positions, and means linking said actuator with said mechanism controller and with said motor for simultaneously moving said actuator to its position wherein it is effective to maintain said mechanism in idle condition and swinging said motor to remove its spindle from contact with said peripheral driving surface, and for releasing said motor and moving said controller to its other said position during movement of said actuator to its other said position.

23. Equipment for use with elongated magnetic records adapted to be fed in either direction between a pair of reels, comprising in combination with a spindle for supporting a supply reel and a spindle for supporting a take-up reel, a disengageable reel drive for the take-up reel, a disengageable reel drive for the supply reel, each of said reel drives including a rotatable element having a friction surface, a brake for the take-up reel, a brake for the supply reel, said brakes being adapted to engage the friction surfaces of the respective rotatable elements of the disengageable reel drives, a brake supporting beam on which both of said brakes are mounted, the beam being shiftable in a direction toward and away from said rotatable elements so as to concurrently engage both brakes upon movement of the beam in one direction and to release both brakes upon movement of the beam in the opposite direction, a motor for driving said reel drives, a switch for starting and stopping the motor, and control mechanism including a manually operable control member, connections extended from the control member to the reel drives and from the control member to said switch, the control member having three positions of adjustment and operating through said connections to establish three conditions of the equipment in one of which the brake beam is advanced to apply both brakes and the switch is actuated to stop the motor, in a second of which the disconnectible drive for the take-up reel is engaged and the brake beam is shifted to disengage both brakes and in the third of which the disconnectible drive for the supply reel is engaged and the brake beam is shifted to disengage both brakes.

24. Equipment for use with elongated magnetic records adapted to be fed in either direction between a pair of reels, comprising in combination with a spindle for supporting a supply reel and a spindle for supporting a take-up reel, a record driving capstan arranged to engage a record in the path of feed between the reels to establish constant speed record feed from the supply reel to the take-up reel, a driving motor having a driving element, a driven element connected with the capstan, means mounting the motor with its driving element for shifting movement to engage and disengage the driving element with respect to said driven element, a disengageable drive for the take-up reel, a disengageable drive for the supply reel, each of the reel drives including a shiftably movable rotatable element, a walking beam on which said rotatable elements of the reel drives are mounted, the beam being shiftable to alternatively and oppositely engage and disengage the two reel drives, and a connection between the movable motor and the walking beam providing for conjoint shifting movement thereof.

References Cited in the file of this patent

UNITED STATES PATENTS

| Number | Name | Date |
|---|---|---|
| 858,847 | Allen | July 2, 1907 |
| 1,789,607 | Steurer | Jan. 20, 1931 |
| 1,952,809 | Kuchenmeister | Mar. 27, 1934 |
| 2,029,730 | Mallina | Feb. 4, 1936 |

(Other references on following page)

UNITED STATES PATENTS

| Number | Name | Date |
|---|---|---|
| 2,086,130 | Hickman | July 6, 1937 |
| 2,096,805 | Hickman | Oct. 26, 1937 |
| 2,213,631 | Heller | Sept. 3, 1940 |
| 2,217,183 | Ross | Oct. 8, 1940 |
| 2,275,961 | Heller | Mar. 10, 1942 |
| 2,297,242 | Pohlmann | Sept. 29, 1942 |
| 2,304,913 | Herzig | Dec. 15, 1942 |
| 2,306,162 | Gipe | Dec. 22, 1942 |
| 2,328,539 | Greenleaf | Sept. 7, 1943 |
| 2,335,277 | Heller | Nov. 30, 1943 |
| 2,349,018 | Lasker | May 16, 1944 |
| 2,356,145 | Begun | Aug. 22, 1944 |
| 2,369,017 | Camras | Feb. 6, 1945 |
| 2,408,320 | Kuhlik | Sept. 24, 1946 |
| 2,418,543 | Camras | Apr. 8, 1947 |
| 2,467,507 | Stone | Apr. 19, 1949 |
| 2,468,198 | Heller | Apr. 26, 1949 |
| 2,481,004 | Dale | Sept. 6, 1949 |
| 2,500,903 | Neff | Mar. 14, 1950 |
| 2,513,423 | Owens | July 4, 1950 |
| 2,514,578 | Heller | July 11, 1950 |
| 2,526,783 | Toogood | Oct. 24, 1950 |
| 2,535,486 | Dank | Dec. 26, 1950 |
| 2,537,260 | Dale | Jan. 9, 1951 |
| 2,538,893 | Begun | Jan. 22, 1951 |
| 2,558,432 | Haloski | June 26, 1951 |

FOREIGN PATENTS

| Number | Country | Date |
|---|---|---|
| 69,273 | Norway | May 28, 1945 |
| 350,090 | Italy | July 5, 1937 |
| 506,232 | Germany | Sept. 1, 1930 |